M. B. RAY AND E. K. HENDERSON.
SPRING WHEEL.
APPLICATION FILED JUNE 11, 1917.

1,320,173.

Patented Oct. 28, 1919.
2 SHEETS—SHEET 1.

Inventors
Madison B. Ray
Edward K. Henderson.

By
Attorney

UNITED STATES PATENT OFFICE.

MADISON B. RAY AND EDWARD K. HENDERSON, OF NEDERLAND, COLORADO.

SPRING-WHEEL.

1,320,173.  Specification of Letters Patent.  Patented Oct. 28, 1919.

Application filed June 11, 1917. Serial No. 174,005.

*To all whom it may concern:*

Be it known that we, MADISON B. RAY and EDWARD K. HENDERSON, citizens of the United States, residing at Nederland, county of Boulder, and State of Colorado, have invented certain new and useful Improvements in Spring-Wheels; and we do declare the following to be a full, clear, and exact description of the invention, such as will enable others skilled in the art to which it appertains to make and use the same, reference being had to the accompanying drawings, and to the characters of reference marked thereon, which form a part of this specification.

Our invention relates to improvements in spring or resilient wheels, the construction being more especially intended for use on vehicles, as automobiles, our object being to provide a construction of this class which shall give the necessary resilience or yielding capacity to obviate the necessity of using pneumatic tires. In our new wheel it will be practicable to employ a solid tire and still have the necessary resilience in the wheel, which is so constructed as to allow the spokes a limited, radial movement in both directions, that is both inwardly and outwardly.

In our improvement each spoke of the wheel is pivotally connected or hinged to the rim at its outer extremity, and is fitted in an opening formed in a keeper plate set inwardly from the rim and connected with a hinged hub member which is provided with a socket in which the inner extremity of the spoke is radially movable the necessary distance in order to obtain the desired resilience or yielding capacity. The said keeper plates and hub members are connected by means of rods arranged on opposite sides of the spoke. Between these rods a spiral spring surrounds the spoke and its extremities engage blocks which are slidable on the rods.

Having briefly outlined our improvement we will proceed to describe the same in detail, reference being made to the accompanying drawings, in which is illustrated an embodiment thereof.

Figure 1:
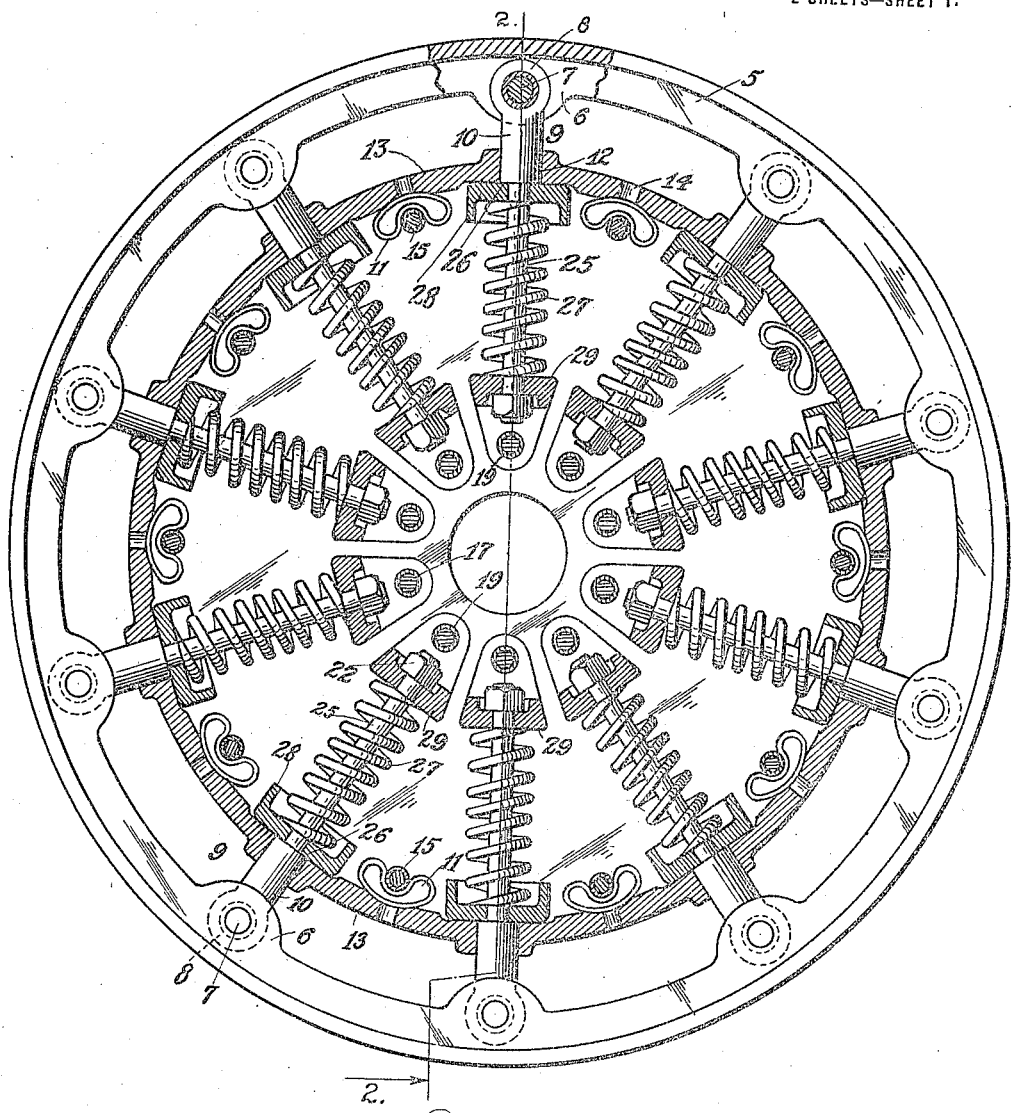

In this drawing Figure 1 is an elevation partly in section, showing our improved spring wheel.

Figure 2:
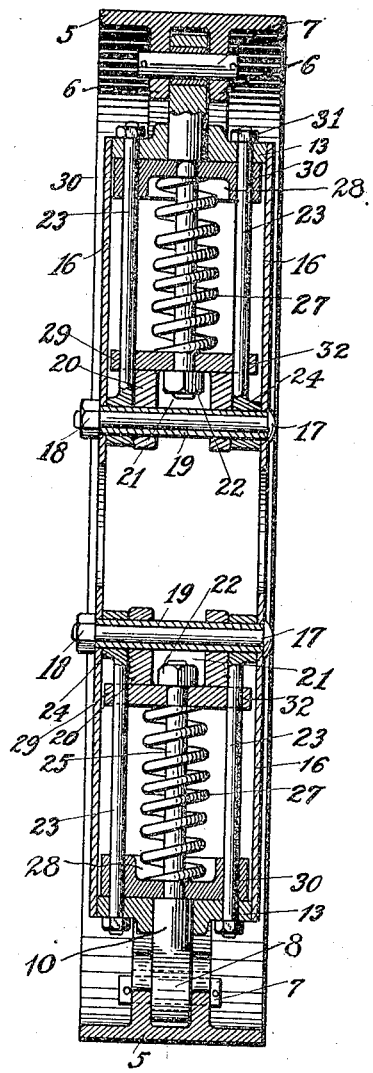

Fig. 2 is a section taken on the line 2—2, Fig. 1.

The same reference characters indicate the same parts in all the views.

Let the numeral 5 designate the rim of the wheel, which is provided with inwardly projecting circular flanges 6 perforated to receive pins 7, which pass through said perforations and registering perforations formed in the outer extremities 8 of a series of spokes 9, whereby the outer extremities of the spokes are pivotally connected with the rim. The outer portion 10 of each spoke adjacent the hinge pin 7, passes through an opening 12 formed in a plate 13, the several plates being spaced as shown at 14 to provide for the necessary movement during the use of the wheel. These openings are normally closed by springs 11 which are held between the plates 13 and bolts 15, passed transversely through the wheel and connecting to side plates 16 which are applied to the wheel on opposite sides. These plates are further connected by means of bolts 17 which are passed therethrough near the center of the wheel, fastening nuts 18 being employed. Each bolt 17 is surrounded by a sleeve 19. The bolts 17 also pass through hub members 20, each of which is provided with a central socket 21 into which the inner extremity of a spoke protrudes, a nut 22 being screwed upon the inner extremity of the spoke and located within the socket 21. Each plate 13 is connected with the corresponding bolt 17 by two rods 23, whose inner extremities are reinforced, as shown at 24, and perforated to register with the perforations in the hub members 20, the bolt 17 passing through the inner extremities of these rods as well as the hub members, the reinforced parts 24 of the inner extremities of the rods serving to properly space the plates 16 at the central portion of the wheel. The portion 25 of each spoke extending inwardly beyond the part 10 is reduced, whereby a shoulder 26 is formed between the parts 10 and 25. This reduced portion of each spoke is surrounded by a spiral spring 27 whose outer extremity engages a block 28 movable on the reduced part of the spoke, the block being perforated to receive the spoke; while the inner extremity of the said spring engages a block 29 which is perforated to receive the inner extremity of the spoke, the nut 22 being screwed against the block 29 which is also perforated as shown at 32 to receive the inner portions of the rods 23, whereby the two blocks 28 and 29 of each spoke are slidable on the spoke and also on the rods 23, the two blocks being spaced by the spiral spring 27, as heretofore explained. Hence, the springs will be compressed whether the spokes move outwardly or inwardly when the wheel is in use, thus giving a high degree of resilience to the wheel under all circumstances. The hub members 20 are secured to the inner ends of the rods 23 so as to move therewith, or they may be integral with the rods. But these members 20 are free of connection with the block 29, in order that the block may have radial movement on the rods.

Having thus described our invention, what we claim is:

In a spring wheel the combination of a rim, spokes hingedly connected with the rim, keepers through which the outer extremities of the spokes pass, the spokes having shoulders adjacent the keepers, blocks engaged by the shoulders, said blocks being perforated to receive the reduced portions of the spokes adjacent the shoulders, hinged hub members, blocks engaging said hub members and perforated to receive the spokes, the hinged hub members being open to allow the inner extremities of the spokes to enter and move freely, springs mounted on the spokes, the extremities of the springs engaging the respective blocks, and rods hinged at their inner extremities and forming guides for the blocks, the said rods also being connected with the keepers.

In testimony whereof we affix our signatures.

MADISON B. RAY.
EDWARD K. HENDERSON.

Copies of this patent may be obtained for five cents each, by addressing the "Commissioner of Patents, Washington, D. C."